United States Patent [19]

Morley

[11] Patent Number: 5,067,696

[45] Date of Patent: Nov. 26, 1991

[54] DEVICE FOR CLAMPING TWO METAL OBJECTS WHICH ARE TO BE WELDED TOGETHER

[76] Inventor: Allen D. Morley, Merellaan 48, B-2080 Kapellen, Belgium

[21] Appl. No.: 661,663

[22] Filed: Feb. 27, 1991

Related U.S. Application Data

[63] Continuation of Ser. No. 230,879, Aug. 11, 1988, abandoned.

[30] Foreign Application Priority Data

Sep. 18, 1987 [NL] Netherlands ............................. 8702239

[51] Int. Cl.⁵ .............................................. B23Q 1/00
[52] U.S. Cl. ........................................ 269/49; 29/271; 29/278; 269/43
[58] Field of Search ........................ 269/32, 43, 47, 49, 269/196, 243; 29/270, 271, 278, 281.1

[56] References Cited

U.S. PATENT DOCUMENTS

| | | | |
|---|---|---|---|
| 3,875,645 | 4/1975 | Tucker et al. | 269/49 |
| 3,883,129 | 5/1975 | Jones | 269/49 |
| 4,175,734 | 11/1979 | Williams | 269/49 |
| 4,175,735 | 11/1979 | Griffin | 269/49 |

Primary Examiner—J. J. Hartman
Attorney, Agent, or Firm—Bachman & LaPointe

[57] ABSTRACT

A device for clamping relative to each other at opposite end edges two metal objects which are to be welded together including a draw bolt, an element screwed onto the draw bolt forming a tension nut, and a bridge piece which has an opening through which the draw bolt passes. The draw bolt at one end bears a relatively thin part with a clamping plate or similar element and at least one element is connected to the draw bolt above the relatively thin part which forms at least one protuberance projecting outwards. The bridge piece has guide means for guiding the protuberance in such a way that an up and down movement of the screw bolt relative to the bridge piece is permitted, but rotary movements of the screw bolt about its central axis are prevented. The relatively thin part may be formed by a blade-shaped member incorporating a window and said clamping plate is arranged for a pivotal movement from a position in which it lies flat inside the window to a position substantially perpendicular to said blade shaped member and visa versa.

19 Claims, 6 Drawing Sheets fig-1 fig-2 fig-3 fig-4 fig-7 fig-8

DEVICE FOR CLAMPING TWO METAL OBJECTS WHICH ARE TO BE WELDED TOGETHER

This is a continuation of application Ser. No. 230,879 filed Aug. 11, 1988, now abandoned.

BACKGROUND OF THE INVENTION

The invention relates to a device for clamping relative to each other at opposite end edges two metal objects which are to be welded together at said edges, in such a way that the end edge faces running essentially parallel to each other are held at a particular distance from each other, in particular for clamping in this way two lengths of pipe which are to be welded together at the head ends, said device comprising a draw bolt provided with an external screw thread, screwed onto it an element forming a tension nut, and a bridge piece which has an opening through which the draw bolt passes with a slight clearance and a contact face which is or can be brought into contact with a contact face on the bottom side of the tension nut element, and which has at its bottom side engaging parts which lie in one flat plane and can be engaged with one of the sides of the objects to be welded together, on either side of the space between the said end edge faces of these objects, the draw bolt at one end bearing a relatively thin part with a clamping plate or similar element, which has, a top edge facing the tension nut element and forming a radially extending shoulder, which can be engaged with the other sides of the objects to be welded together, on either side of the space between the said end edge faces thereof. Such a device is known from U.S. Pat. No. 4,175,735.

In the use of such a device for, for example, welding together lengths of pipe, in which at least three of these devices are used, these devices are each disposed between the lengths of pipe in such a way that the clamping plate comes to rest inside the lengths of pipe, at right angles to the opposite end faces thereof, and these end faces rest on either side against the relatively thin part. If the bridge piece with the engaging parts thereof is then brought to rest on either side of the space between the end faces against the outsides of the lengths of pipe, during or following which the tension nut is tightened, the walls of the lengths of pipe are clamped between the shoulder of the clamping plate resting against the insides and the engaging parts of the bridge piece resting against the outsides of the lengths of pipes, so that the end faces of the lengths of pipe come to rest running virtually parallel precisely opposite each other, with a space between them which determines the weld to be made, and the width of which is essentially equal to the thickness of the relatively thin part.

When a number of first welds have been made in the peripheral parts of the space between the end faces of the lengths of pipe, situated between the devices thus disposed, the devices are removed and the welding together of the lengths of pipe completed. On removal of each device, the tension nut is loosened and the clamping plate turned through 90 degrees, so that the clamping plate finishes parallel to the end faces of the lengths of pipe, so that this plate can be pulled out.

The known device in which said relatively thin part is formed by a neck part which on its free end bears the clamping plate has the disadvantage that, when the tension nut is tightened, the torque exerted through the screw threads on the draw bolt is transferred to the thin and thereby breakable neck part of the draw bolt, unless the handle provided at the upper end of the draw bolt is kept absolutely motionless as tension is applied. This is difficult to achieve, which means that this neck part can easily break during tightening of the tension nut. Besides, this neck part is generally subjected to bending stress in the process, since on tightening of the tension nut the insides of the lengths of pipe are taken, through the shoulders of the clamping plate, to a position in line with each other, where the shoulders can be unevenly loaded.

SUMMARY OF THE INVENTION

The object of the invention is to produce a device of the known type which does not have these disadvantages.

This object is achieved in that in the device according to the invention the draw bolt is provided with at least one element which is connected above the relatively thin part to the draw bolt and which forms at least one protuberance projecting outwards at right angles to the central axis of the draw bolt, and the bridge piece has guide means for guiding said protuberance in such a way that an up and down movement of the draw bolt relative to the bridge piece is permitted, but rotary movements of the draw bolt about its central axis are prevented.

In a device designed in this way, when the tension nut is being tightened the said torque is resisted by the protubrerance received by the guide means, and is thus not transferred to the relatively thin part.

This feature allows that said relatively thin part is formed by a blade shaped member incorporating a window and that said clamping plate is arranged for a pivotal movement from a position in which it lies flat inside the window so that it extends substantially in the same plane as the blade-shaped member, to a position substantially perpendicular to said plane and visa versa, preferably a slot being formed in the blade-shaped member below its window and said member being arranged for also an up and down movement so that in its lowermost position and when turned into its said perpendicular position, at least a portion of said member is engaged by said slot.

The blade-shaped member is prevented from possible damage by twisting forces, as the pulling force is excerted by the draw bolt. The device can excert a great pulling force, because the tensile areas of the blade-shaped member at each side of the window have a combined cross section area which is much larger than the cross section of the neck part of the known device so that the device according to the invention having a blade-shaped member will not only bring the objects to be welded together into alignment, but is also capable to correct deformation in said objects. This is a very important aspect since a common difficulty when joining by butt welding, two cylindrical or flat blade parts is that the two sides of the joint are not always true with each other. This results in a condition usually referred to as "hi-low".

The above-mentioned element is preferably formed by a pin running at right angles to the central axis of the draw bolt, and the guide means of the bridge piece are formed by at least one groove which runs parallel to the central axis of the draw bolt, and which accommodates a freely projecting end part of the pin with no more than slight clearance in the widthwise direction of the groove.

The said groove can here be formed in an advantageous manner by a groove running radially outwards from the periphery of the opening in the bridge piece, which preferably has at the top side thereof a cylindrical element which is disposed coaxially round the draw bolt, and through which the opening and the groove continue in the axial direction over a particular distance.

In a device of the present type, where the bridge piece is generally U-shaped in cross section, said groove can, according to the invention, be formed at the inside of at least one of the side walls of the bridge piece.

Several grooves running parallel to each other can be formed at the inside by at least one of the side walls of the bridge piece, said grooves being connected to each other by means of a transverse groove disposed at right angles thereto, while the opening in the bridge piece is elongated.

A device designed in this way is particularly suitable for clamping relative to each other, a relatively short part, for example a flange piece and a length of pipe, by placing the protuberance in a groove which is closer to one side of the bridge piece than the other side, so that the draw bolt also comes to lie closer to this one side, with the result that this one side of the bridge piece can be brought to rest against the short part, closer to the space between the end faces of the parts to be welded together, than the other side of the bridge piece which rests against the longer part.

For good guidance of the draw bolt when the protuberance is being slid from one groove into the other, it is preferable to dispose round the draw bolt a generally block-shaped element which lies above the relatively thin part, essentially inside the bridge piece, and which has two opposite parallel faces each running parallel with a small spacing to the relevant side wall of the bridge piece, while provision is made in an advantageous manner for a spring element which rests at one side against the top side of the block-shaped element and at the other side against the inside of the transverse part of the U-shaped arch piece.

The block-shaped element can, however, also as such form the above-mentioned element connected above the relatively thin part to the draw bolt, so that in that case there is no pin, and the guide means of the bridge piece are formed by the insides of the side walls thereof.

In order also to prevent the relatively thin part from being subjected to bending stress during tightening of the tension nut, the above-mentioned contact face of the bridge piece and that of the tension nut are preferably of such a curved shape and complementary curved shape respecively that the draw bolt can swing at least into the plane of the clamping plate when the above-mentioned faces are resting against each other.

In order to permit easy removal of the device after the first welds have been made, where through shrinking of these welds the end face of the objects are drawn forcefully against the said section of the neck part, the section of the neck part adjoining the clamping plate preferably has in cross section a dimension in the direction perpendicular to the clamping plate which is smaller than the dimension in the direction perpendicular thereto, and the greatest cross section dimension of the other section of the neck part is also smaller than the last-mentioned dimension.

In this way, after the tension nut has been loosened, the clamping plate can be moved inwards, for example by striking the draw bolt, so that the said other thinner section of the neck part goes between the end faces and the clamping plate can then be easily turned through 90 degrees in order to be able to pull it out.

The side faces of the clamping plate are preferably bevelled off towards the side edges of this plate, and the bottom edge of the clamping plate merges, via upward-slanting and outward-running parts, with the side edges of this plate.

BRIEF DESCRIPTION OF THE DRAWINGS

The invention is explained in greater detail with reference to the drawing, in which FIG. 1 in a lengthwise section shows a first embodiment of the device according to the invention, in the fitted state.

DETAILED DESCRIPTION

Figure 1:
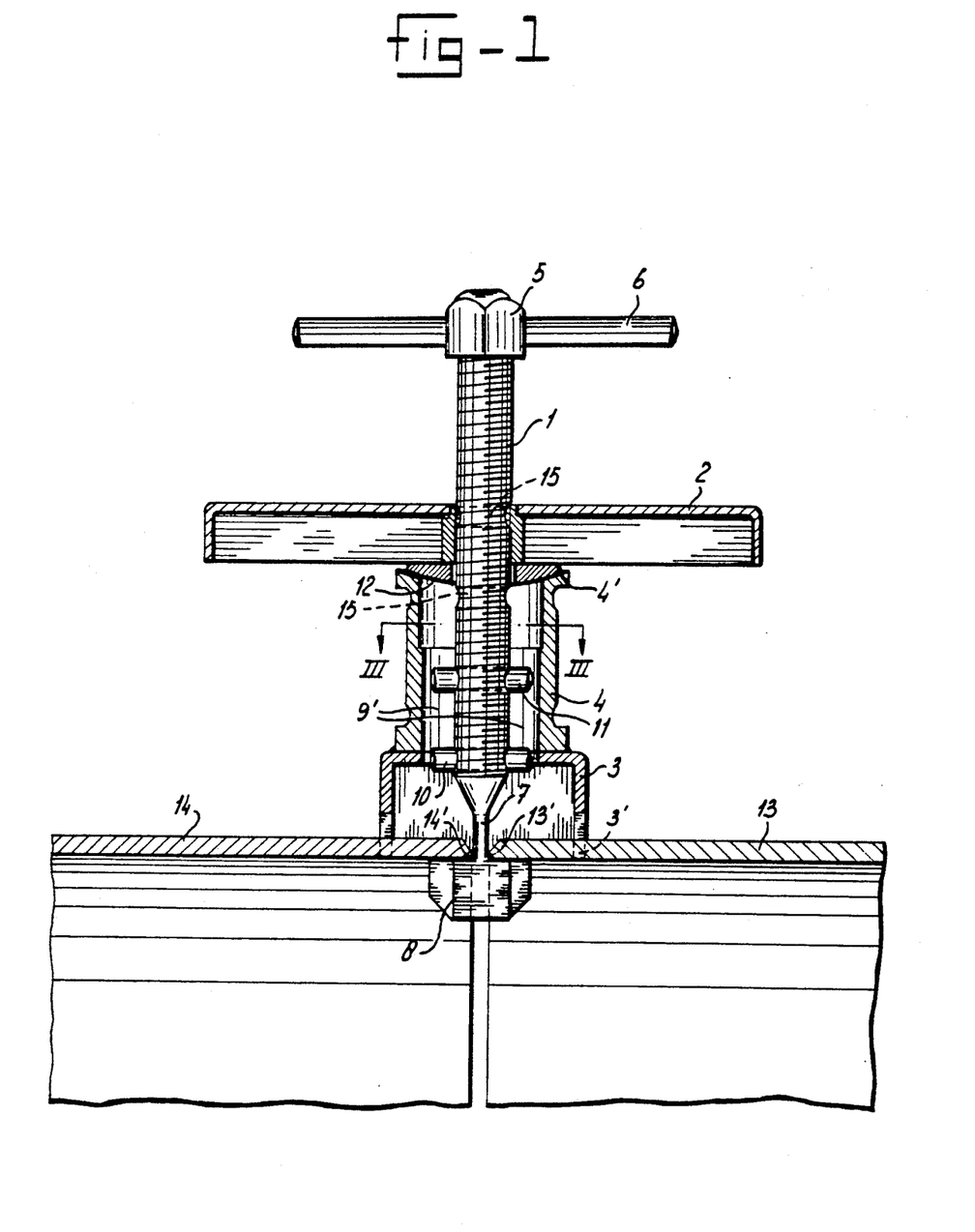
Figure 2:
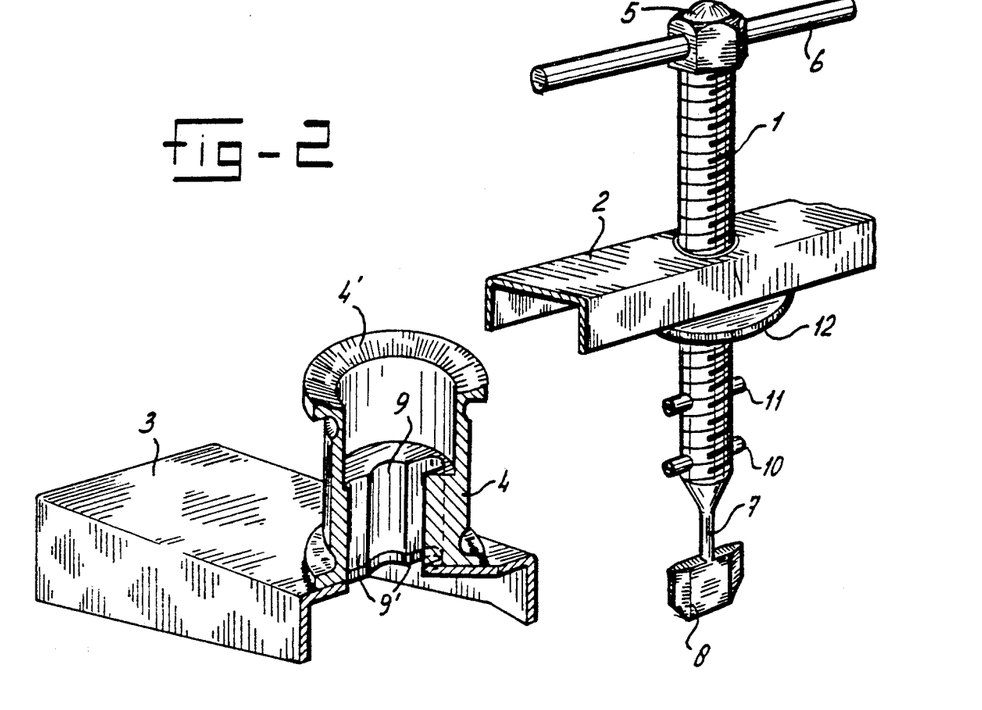
FIG. 2 shows the parts of the device according to FIG. 1, in perspective and partially cut away.
Figure 3:
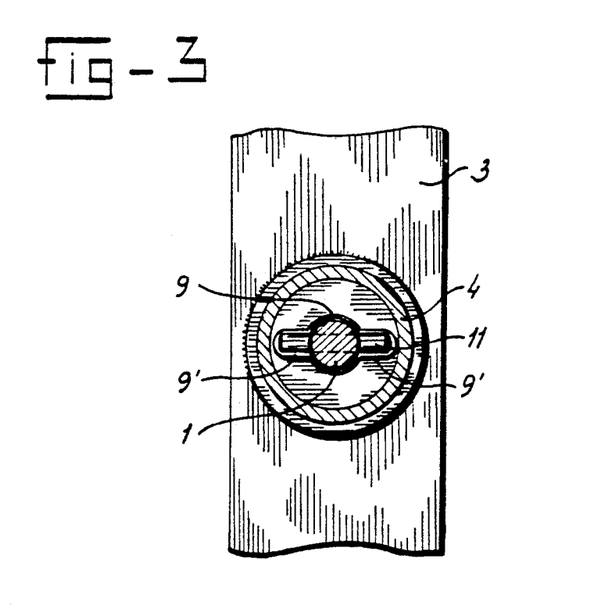
FIG. 3 is a cross section along the line III—III in FIG. 1.

As shown in FIGS. 1, 2 and 3, the device according to the invention has a draw bolt 1 which is provided with external screw thread and has a tension nut 2 screwed thereon and a bridge piece 3, which at the top side thereof has a cylindrical element 4. The draw bolt 1 is provided at its top end with a head 5 which has a handle 6 running through it. At the bottom end, the draw bolt 1 merges into a neck part 7, which at the free end bears a clamping plate 8. The bridge piece 3 is U-shaped in cross section and has at its bottom side engaging parts 3', which lie in one flat plane and are formed by the outside parts of the bottom sides of the side walls of the U-shape, and thus prevent the bridge 3 from rotating when tension nut 2 presses it into contact with the parts to be joined.

Disposed in the top side of the bridge piece 3 is an opening 9 for the screw bolt to pass through. From the periphery of this opening 9 run two radially directed grooves 9', the opening and the grooves 9' continuing in the axial direction for some distance inside the cylindrical element 4. The grooves 9' are provided to accomodate pin-shaped protuberances 10 and 11, which are provided on the screw bolt 1.

The top end 4' of the cylindrical element 4 is designed as a concave annular surface against which the convex contact face 12 formed at the bottom side of the securing nut 2 rests, so that the draw bolt 1 can swing slightly during tightening of the tension nut 2, which means that the neck part 7 is not subjected to bending stress.

Figure 4:
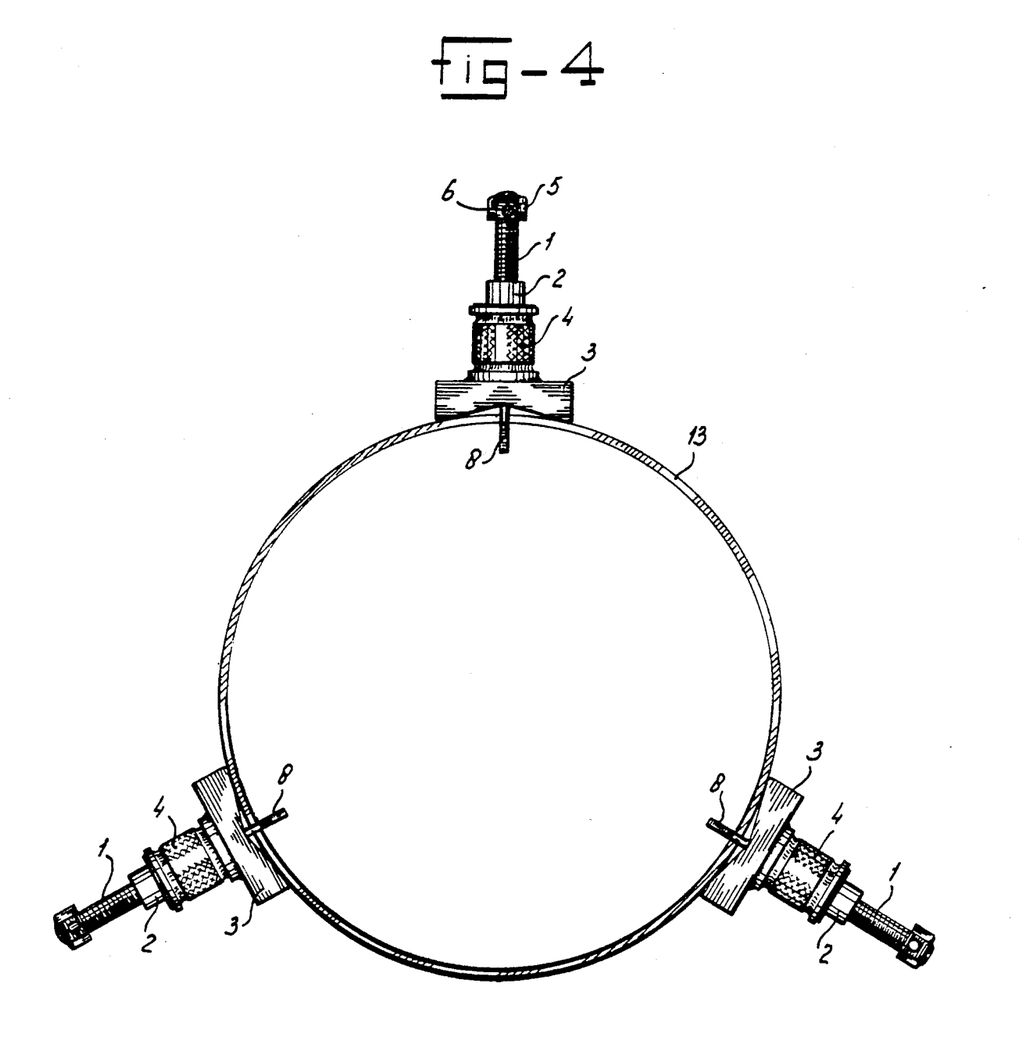
FIG. 4 shows three devices according to FIG. 1, in the fitted state.

As shown in FIGS. 1 and 4, the lengths of pipe 13 and 14 are held firmly between the clamping plate 8 and the bridge piece 3 when the tension nut 2 is tightened, at least three clamping devices being used, as shown in FIG. 4. The end faces 13' and 14' of the lengths of pipe 13 and 14 are positioned precisely opposite each other running essentially parallel to each other, with a space between them, for determining the weld to be made, the thickness of which is equal to the diameter of the section of the neck part 7 adjoining the clamping plate.

Figure 5:
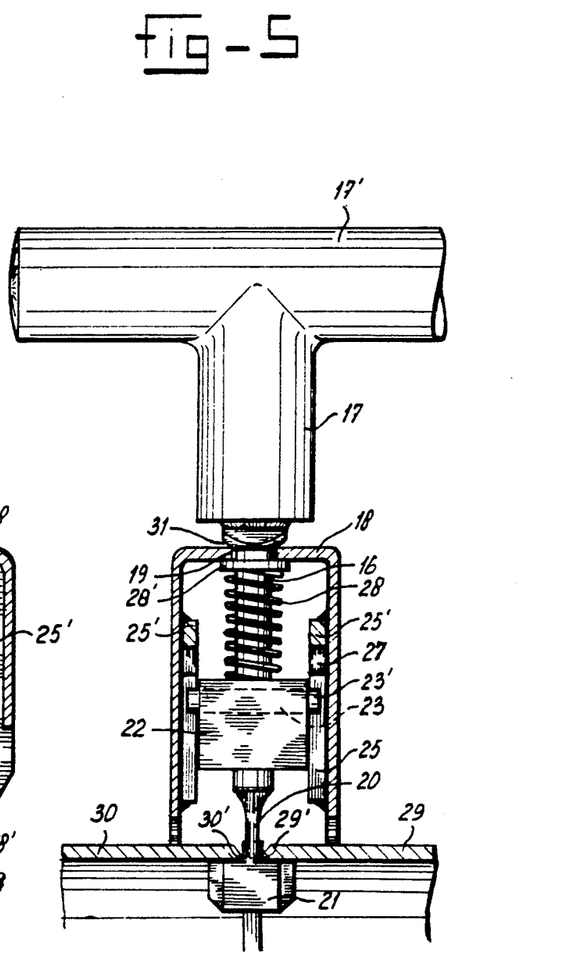
FIG. 5 shows a second embodiment of the device according to the invention, in lengthwise section.
Figure 6:
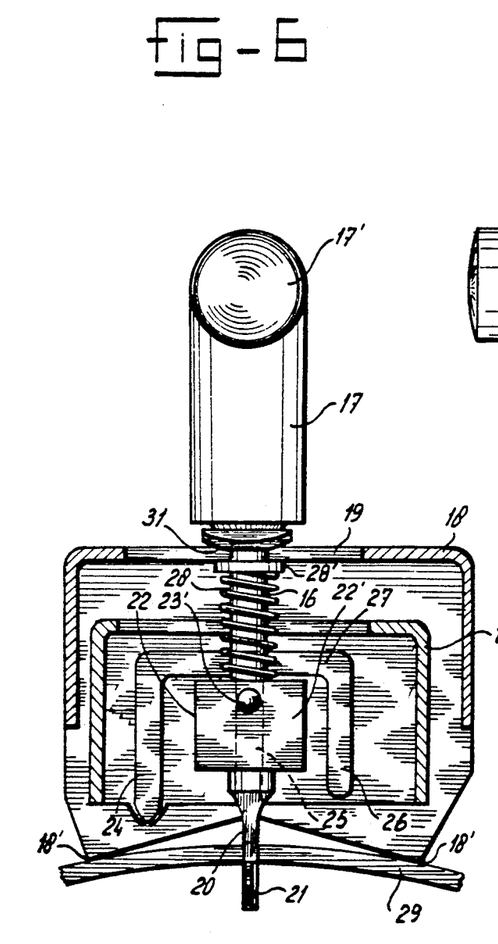
FIG. 6 shows the device according to FIG. 5 in the cross sectional plane at right angles thereto.

The draw bolt 16 runs through an oblong opening 19, which is provided in the transverse part of the U-shaped bridge piece 18. The bridge piece 18 is again provided with engaging means 18'.

The draw bolt 16 merges into a neck part 20, which has a clamping plate 21 which is integral with or connected to its bottom end.

The draw bolt 16 also runs through or has a block-shaped element 22, which, if a separate piece is then retained by radial pin 23 running through the draw bolt 16 and the block-shaped element 22, the ends 23', of said pin 23 projecting beyond two opposite side faces 22' of the element 22 which run parallel to each other. This pin 23 is also required if the draw bolt and block 22 is one piece because these projecting parts 23' of the pin 23 are accommodated in one, 25', of three sets of axially running grooves 24, 25 and 26, which are connected to each other by means of a transverse groove 27, the grooves 24 to 27 being formed in plate-shaped parts which are fixed to the bridge piece 18 on the inside.

Provision is also made for a coil spring 28, which is disposed around the draw bolt 16 and with its one end rests via a supporting plate 28' against the bottom side of the transverse part of the bridge piece 18, while at its other end it rests against the top side of the block-shaped element 22.

If the draw bolt 16 in FIGS. 5 and 6 is now pulled upwards by means of the handle 17', in the process of which the spring 28 is compressed, the projecting parts 23' can be taken into the transverse groove 27 and then taken sideways into the top end of the groove 24 and 26, following which by letting go of the handle 17', the projecting ends 23' are pressed by the spring 28 into the groove 24 or 26 in question. In this way, the bridge piece 18 can thus be engaged with the outsides of these parts 29 and 30 at unequal distances from the space between the end faces 29' and 30' of the parts 29 and 30, instead of at equal distances thereof, as shown in FIG. 6.

Disposed at the bottom end of the screw bolt 17 is a contact face part 31, designed as a rocking piece, so that the draw bolt 16 can swing to and fro the some extent in the plane of the clamping plate 21.

Figures 7, 8:
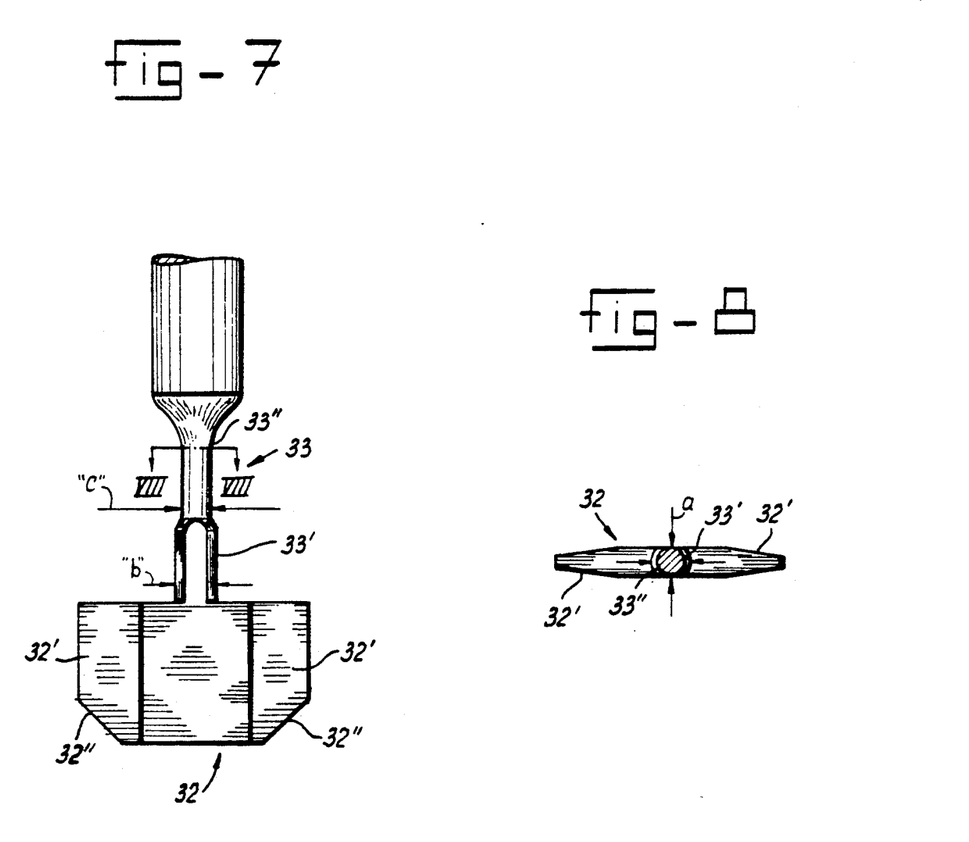
FIG. 7 shows the neck part of the screw bolt with the clamping plate in greater detail.
FIG. 8 is a section along the line VIII—VIII in FIG. 7.

As shown in FIGS. 7 and 8, the section 33' of the neck part 33 adjoining the clamping plate 32 has in cross section a dimension "a" in the direction perpendicular to the clamping plate which is smaller than the dimension "b" in the direction perpendicular thereto, while the largest cross section dimension "c" of the remaining section 33' of the neck part 32 is also smaller than the dimension "b". The dimensions "a", "b" and "c" are, for example 2.50, 3.25 and 2.50 mm respectively.

It can also be seen that the side faces 32' of the clamping plate are bevelled towards the side edges of said plate and that the bottom edge of the clamping plate merges via upward-slanting and outward-running parts 32" into the side edges of the plate.

When a clamping device such as that shown in FIG. 1 has to be removed, the tension nut 2 is first loosened and then, by for example striking the head 5, the clamping plate 8 is moved inwards, so that the said other section 33' of the neck part 7 comes to rest between the end faces 13' and 14', this section having a smaller diameter than the section of the neck part 7 adjoining the clamping plate 8, so that the clamping plate 8 can then easily be turned through 90 degrees, by means of turning the handle 6, with the result that the clamping plate finishes running parallel to the end faces 13' and 14'. Thereafter, the clamping plate 8 can be pulled out by tightening the tension nut 2 again.

Figure 9:
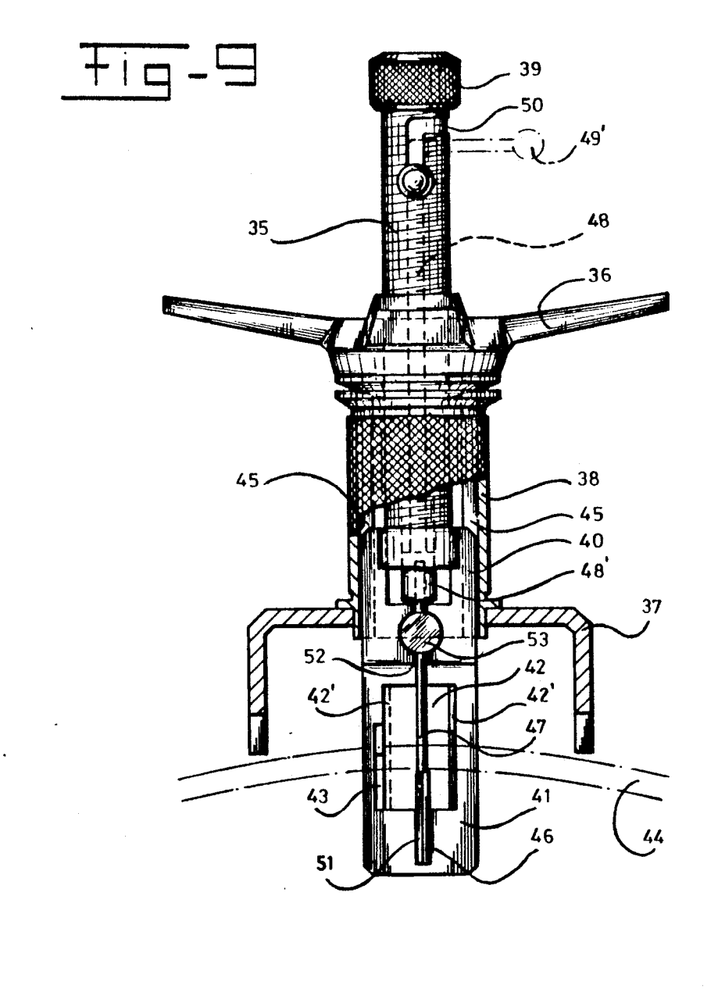
FIG. 9 and 10 show a third embodiment of the device according to the invention in two lengthwise sections respectively.
Figure 10:
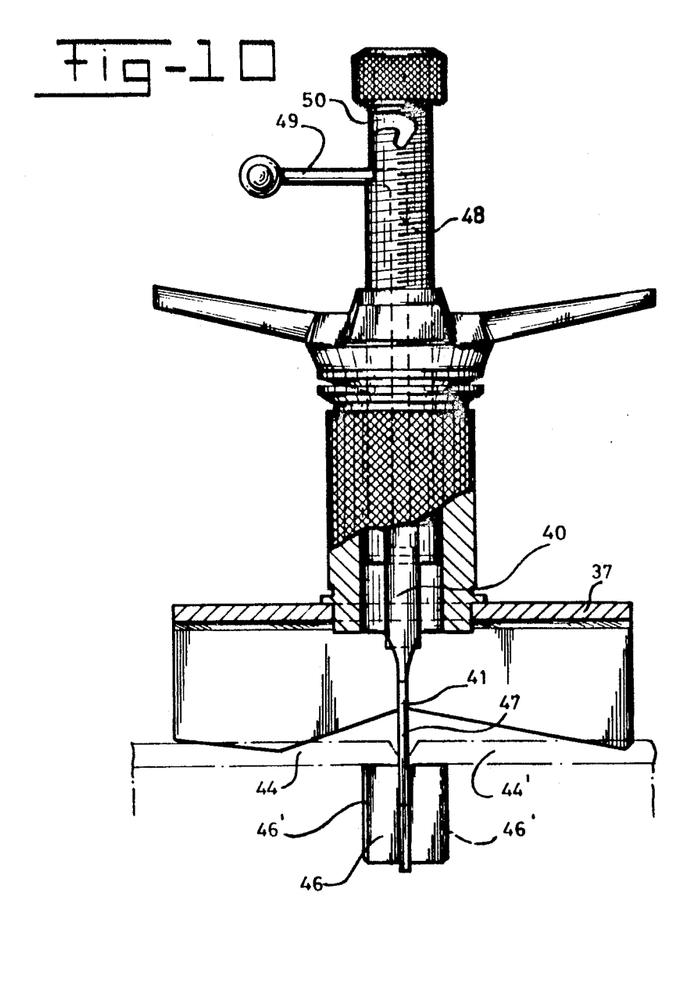

The embodiment shown in FIGS. 9 and 10 has a draw bolt 35 provided with an external screw thread on which a tension nut 36 is screwed which is in the shape of a wing nut. Further the device comprises a bridge piece 37, which at the top side thereof has a cylindrical element or bridge tower 38. The draw bolt 35 is provided at its top end with a bolt cap 39. At its bottom end, the draw bolt 35 is connected to a connecting piece 40 which merges into an integral blade-shaped member 41 which incorporates a specially proportioned window 42 and on which is a small raised area 43 that is ground to a special profile to set the gap between the pipe sections 44 and 44' and to facilitate the removal of the plate 41 after the portions of the root weld have been made.

The bridge tower 38 is provided with internal slotted guide grooves 45 which accomodate the edge portions of connecting piece 40 so that said guide grooves act as torsion restraining guide grooves when pulling force is excerted by the draw bolt 35.

Further a clamping plate 46 having an integral spindle 47 is provided. Said spindle 47 is connected at its top end at 48' to an operating spindle 48 which extends through draw bolt 35 which is made hollow. Said operating spindle carries a lever handle 49 arranged for moving in a gate slot 50 cut in draw bolt 35 so that in manipulating the handle 49 it is moved upwardly and turned over 90 degrees to the position 49' as shown in FIG. 9. Said movement of the handle 49 results through operating spindle 48 and spindle 47 in an upward movement and an angular movement over 90 degrees of clamping plate 46 so that then said plate 46 lies flat and is seated inside window 42 of blade-shaped member 41 so that the clamping plate 46 can be inserted and withdrawn through the weld gap. The spindle 47 is heat treated to give it a predetermined flexibility so as to counteract torsional forces and act as a torsion bar spring holding the clamping plate in its insert and withdrawal position with its recesses 46' against the seat recesses 42' provided along the longitudinal sides of the window 42.

In blade-shaped member 41, below the window 42 a slot 51 is situated so that the clamping plate 46 in its lowermost position and turned 90 degrees, is supported by slot 51, as shown in FIGS. 9 and 10.

Between the end of operation spindle 48 and upper end of window 42 the spindle 47 of clamping plate 46 runs in a machined slot 52 with a button bearing 53 inserted at approximately the half way point. This bearing 53 can be adjusted to ensure that clamping plate 46 is correctly aligned in window 42 so that no part of spindle 47 and clamping plate 46 projects above either of the flat surfaces of the blade shaped member 41.

Blade shaped member 41 is drawn up by wing nut 36 revolving around draw bolt 35 and is released by being driven inwards by a blow on the end cap 39, after wing nut 36 is first loosened, to allow the clamping plate to be drawn back and turned 90 degrees by the spindle handle 49 thus nesting clamping plate 46 in blade shaped member 41 before said member is withdrawn by retightening of the wing nut 36.

By means of the slotted torsion restraining guide grooves 45 the thin blade shaped member 41 is prevented from possible damage by twisting forces, as pulling force is excerted by the draw bolt. The clamping device can excert a great pulling force, because the tensile areas of blade shaped member 41 at each side of the window 42 have a relative large combined cross section area, so that also deformations in the parts to be joined can be corrected.

I claim:

1. A device for clamping two metal objects relative to each other at opposite end edges wherein the metal objects are to be welded to each other at said edges, in such a way that the end edges are held at a particular distance from each other, with a predetermined space between said edges said device comprising:

a draw bolt provided with an external screw thread and a central axis;

an element forming a tension nut screwed onto the draw bolt having a lower side with a contact face;

a bridge piece having an opening through which the draw bolt passes with a slight clearance and having a contact face which engages the tension nut contact face;

object engaging parts of said bridge piece being located at the bottom thereof a portion of said object engaging parts lying in one flat plane such that each of the object engaging parts engages one of said opposite end edges on a first surface thereof and said bridge piece spans said predetermined space;

a clamping plate at one end of the draw bolt having a top edge facing the tension nut and forming a radially extending shoulders which can be engaged with a second side of each of the objects to be welded together on either side of the space between the end edges thereof;

a relatively thin blade-shaped member being insertable into said predetermined space and being connected to said draw bolt, said blade-shaped member having a window wherein said clamping plate is pivotably movable from a position in which said clamping plate lies flat inside the window so that said clamping plate extends substantially in the same plane as the blade-shaped member, to a position substantially perpendicular to said plane and vice-versa:

at least one element connected to the draw bolt above the clamping plate which forms at least one protuberance projecting outwards at right angles to the central axis of the draw bolt; and guide means of said bridge piece for guiding said protuberance in such a way that an up and down movement on the draw bolt relative to the bridge piece is permitted, but rotary movements of the draw bolt about its central axis are prevents.

2. Device according to claim 1, characterized in that a slot is formed in the blade-shaped member below said window and said member being movable up and down so that in a lowermost position and when turned into said perpendicular position, at least a portion of said clamping plate is engaged by said slot.

3. Device according to claim 2, characterized in that said clamping plate is fixed to a spindle which substantially extends through the draw bolt which is made hollow, said spindle having a lever handle at its free end which cooperates with a slot cut in the draw bolt.

4. Device according to claim 3, characterized by a connecting piece between said blade-shaped member and the draw bolt, said connecting piece including a button bearing connected to said spindle.

5. Device according to claim 4, characterized in that said connecting piece forms also said protuberance projecting outwards at right angles to the central axis of the draw bolt.

6. Device according to claim 1, characterized in that the said at least one element is formed by a pin running at right angles to the central axis of the screw bolt, and the guide means of the bridge piece are formed by at least one groove which runs parallel to the central axis of the draw bolt, and which accommodates a freely projecting end part of the pin with no more than slight clearance in the widthwise direction of the groove.

7. Device according to claim 6, characterized in that the said groove is formed by a groove running radially outwards from the periphery of the opening in the bridge piece.

8. Device according to claim 7, characterized in that the bridge piece has at the top side thereof a cylindrical element which is disposed coaxially around the draw bolt, and through which the opening and the groove continue in the axial direction over a particular distance.

9. Device according to claim 6, in which the bridge piece is generally U-shaped in cross section, characterized in that said groove is formed at the inside of at least one of the side walls of the bridge piece.

10. Device according to claim 9, characterized in that several grooves running parallel to each other are formed at the inside of at least one of the side walls of the bridge piece, said grooves being connected to each other by means of a transverse groove disposed at right angles thereto, while the opening in the bridge piece is elongated.

11. Device according to claims 9 or 10, characterized in that provision is made around the screw bolt for a generally block-shaped element which lies essentially inside the bridge piece, and which has two opposite parallel faces, each running parallel with a small passing to the relevant side wall of the bridge piece.

12. Device according to claim 11, characterized in that provision is made for a spring element which rests at one side against the top side of the block-shaped element and at the other side against the inside of the transverse part of the U-shaped bridge piece.

13. Device according to claims 11 or 12, characterized in that the pin running transversely to the central axis of the screw bolt projects essentially through the block-shaped element and projects outwards at at least one of the said faces thereof.

14. Device according to claim 13, characterized in that no pin is present, so that the said element connected to the draw bolt above the neck part is formed by the block-shaped element, and the guide means of the bridge piece are formed by the insides of the side walls of said bridge piece.

15. Device according to claim 1, characterized in that said object engaging parts of the bridge piece and complimentary portion of the tension nut are of a curved shape and such that the draw bolt can swing at least into the plane of the clamping plate when the above-mentioned faces are resting against each other.

16. Device according to claim 1, characterized in that said relatively thin part is formed by a neck part which on its free end bears the clamping plate and the section of the neck part adjoining the clamping plate has in cross section a dimension in the direction perpendicular to the clamping plate which is smaller than the dimension in the direction perpendicular thereto, and the greatest cross section dimension of the other section of the neck part is also smaller than the last-mentioned dimension.

17. Device according to claim 1, characterized in that side faces of the clamping plate are bevelled towards side edges of said plate.

18. Device according to claim 1, characterized in that a bottom edge of the clamping plate merges via upward-shaping and outward-running parts into side edges of the plate.

19. Device according to claim 1 for clamping two lengths of pipe having end edges which are to be welded together at their end edges.

* * * * *